United States Patent [19]
Weigand et al.

[11] 3,796,029
[45] Mar. 12, 1974

[54] CENTER GATHERER FOR FORAGE HARVESTERS

[75] Inventors: Rex O. Weigand, Newton; Kenneth R. McMillen, Moundridge, both of Kans.

[73] Assignee: Hesston Corporation, Hesston, Kans.

[22] Filed: Apr. 9, 1973

[21] Appl. No.: 348,981

[52] U.S. Cl. ............................. 56/119, 56/94
[51] Int. Cl. ............................. A01d 45/02
[58] Field of Search ............. 56/119, 71, 73, 80, 84, 56/89, 94, 99, 13.5, 13.9, 14.1, 14.2, 14.3, 12.6

[56] References Cited
UNITED STATES PATENTS

| | | |
|---|---|---|
| 3,126,691 | 3/1964 | Krahn et al. ........................ 56/119 |
| 3,139,718 | 7/1964 | Rickerd et al. ...................... 56/119 |
| 3,156,079 | 11/1964 | Park et al. ............................ 56/2 |
| 3,462,922 | 8/1969 | Phillips et al. ...................... 56/14.3 |
| 3,623,298 | 11/1971 | Hitzhusen ............................. 56/2 |

*Primary Examiner*—Russell R. Kinsey
*Attorney, Agent, or Firm*—Schmidt, Johnson, Hovey & Williams

[57] ABSTRACT

A three-row forage harvester has a header provided with a stalk gatherer above the dividers thereof which includes a primary gathering unit having a stalk receiving throat and a secondary stalk engaging unit releasably connected to the primary unit within the throat. The yoke of the secondary unit may be height adjusted not only by virtue of the use of extensible yoke supporting arms but by virtue of the invertibility of the entire secondary unit itself.

10 Claims, 3 Drawing Figures

PATENTED MAR 12 1974 3,796,029

CENTER GATHERER FOR FORAGE HARVESTERS

Row crop forage harvesters are conventionally provided with stalk dividers to properly guide each row separately into the header for severance of the stalks and for advancement, through use of gathering chains, to feeder rolls which, in turn, direct the stalks into the chopping chamber. Additionally, above the dividers, the headers are provided with stalk gatherers whose function of separating the rows in much the same as that of the dividers except that the stalk gatherers also operate to lean the crop forwardly so as to provide for better severing and feeding operations.

It is also advantageous, in three-row harvesters, to separate, as well as to bend forwardly, the center crop row, and such is the subject matter of our present invention. We accomplish these results by use of a secondary stalk gathering unit within the throat of the primary stalk gathering unit, releasably attached to the latter in a manner to permit vertical adjustments so as to accommodate for crops of various heights.

Figure 1:
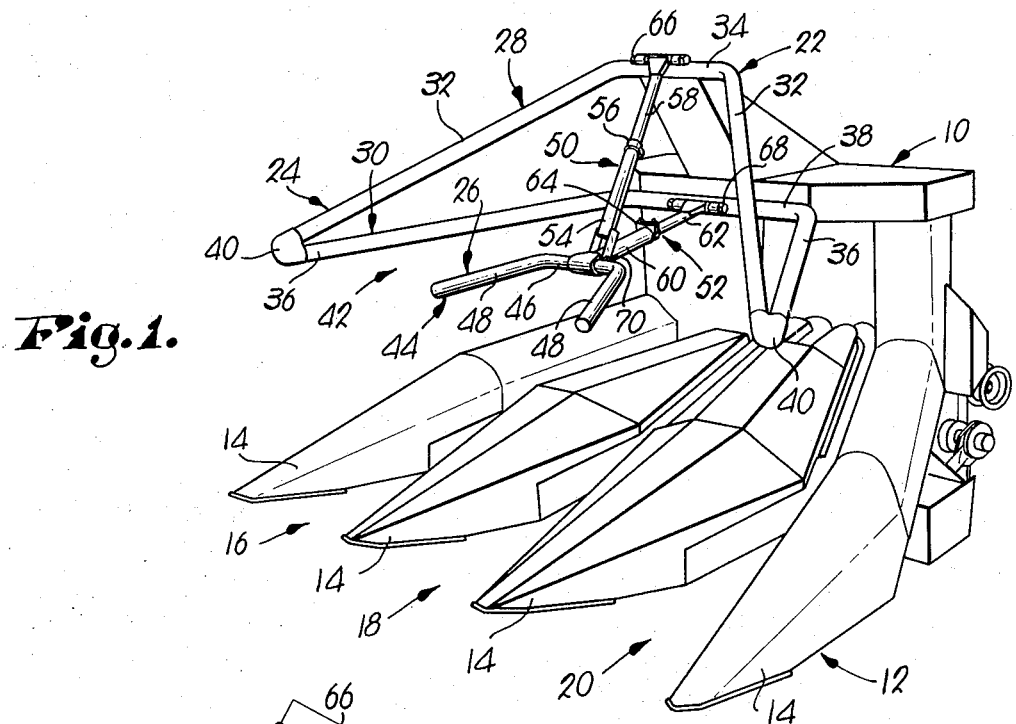
FIG. 1 is a front left perspective view of a header for forage harvesters illustrating the stalk gatherer which forms the subject matter of the present invention.

Forage harvester 10 has a header 12 which includes dividers 14 spaced to present passages 16, 18 and 20 for three crop rows within which the stalks are severed and then directed rearwardly by conventional gathering chains.

A stalk gatherer 22, mounted on the header 12 above the dividers 14, includes primary and secondary stalk receiving and engaging units 24 and 26 respectively. The primary unit 24 has upper and lower generally U-shaped sections 28 and 30 respectively, the upper of which has a pair of legs 32 converge toward a rear intermediate portion 34. Similarly, the lower section 30 has a pair of legs 36 which converge toward a rear intermediate portion 38 spaced vertically below the portion 34. The legs 32 converge with corresponding legs 36 and are joined therewith at leading noses 40 to define horns which are spaced horizontally to present a throat 42.

The secondary center unit 26, disposed within the throat 42, is releasably carried by the unit 24 and includes a generally U-shaped, forwardly opening yoke 44 having a bight 46 and a pair of horizontally spaced fingers 48. Extensible support arms 50 and 52 for yoke 44, disposed within a common, median, vertical plane, converge as the bight 46 is approached.

The arm 50 includes a tube 54 having its rear end split and surrounded by a clamp 56, together with a T-shaped element 58 that extends into the tube 54. The arm 52 includes a tubular fork 60 rigid to and extending rearwardly from the bight 46, together with a T-shaped element 62. The rear end of the fork 60 is split, receives the element 62 and is surrounded by a clamp 64. A bracket 65 surrounds the bight 46 and is rigid to both the latter and the fork 60.

Figure 2:
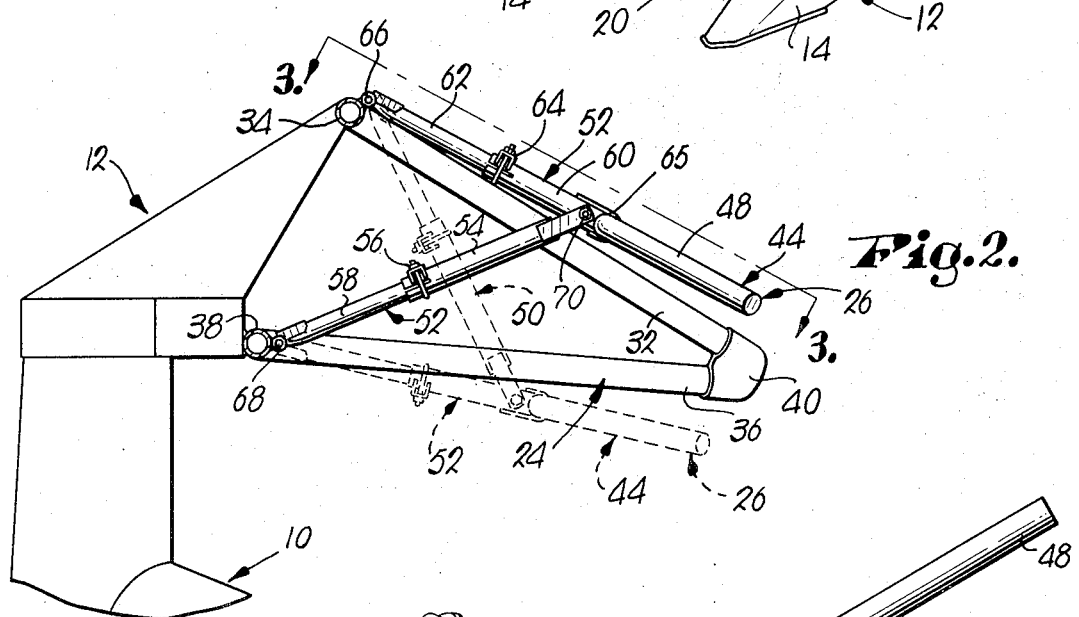
FIG. 2 is an elevational view of the right side of the aforementioned header.
Figure 3:
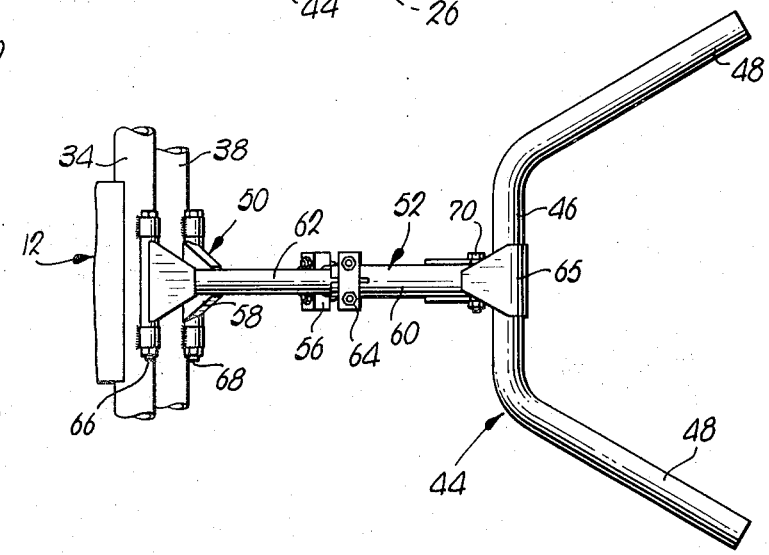
FIG. 3 is a fragmentary plan view taken on line 3—3 of FIG. 2.

In one position of the yoke 44 (for handling short crops) as shown by FIG. 1 and by dotted lines in FIG. 2, the longer arm 50 is above the shorter arm 52 and has its element 58 hingedly coupled with the portion 34 by a pivot bolt 66, whereas the element 62 is hingedly coupled with the portion 38 by a pivot bolt 68. In a second position of the yoke 44 (for handling tall crops) as shown in FIG. 3 and by full lines in FIG. 2, the arm 50 is below the arm 52 and has its element 58 hingedly coupled with the portion 38 by the pivot bolt 68, and the element 62 of the arm 52 is hingedly coupled with the portion 34 by the pivot bolt 66. The tube 54 is hingedly coupled with the fork 60 by a pivot bolt 70 passing through the bifurcated end of the tube 54 which embraces the fork 60.

The yoke 44 is changed between the two positions by merely removing the bolts 66, 68 and inverting the entire unit 26. But in either position the height of the yoke 44 may also be adjusted more minutely by loosening the clamps 56 and 64 to cause the elements 58 and 62 to slide in the tube 54 and the fork 60 respectively as the arms 50 and 52 pivot about bolts 66, 68 and 70.

Having thus described the invention, what is claimed as new and desired to be secured by Letters Patent is:

1. In a stalk gatherer for row crop harvesters:
   a gathering unit having a forwardly opening, stalk engaging yoke; and
   a support for said yoke including:
   a pair of relatively superimposed arms attached to the yoke and extending rearwardly therefrom, and
   structure at the rearmost ends of the arms for connecting the same with the harvester,
   the arms diverging as said rearmost ends thereof are approached.

2. In a stalk gatherer as claimed in claim 1 wherein said arms are of differing lengths and said unit is invertible for varying the height of said yoke.

3. In a stalk gatherer as claimed in claim 1 wherein said arms are extensible for varying the height of said yoke.

4. In a stalk gatherer as claimed in claim 1 wherein said arms are in a common vertical plane.

5. In a stalk gatherer as claimed in claim 1 wherein said yoke is generally U-shaped, presenting a bight and a pair of fingers, one of the arms including a fork extending rearwardly from the bight to which the other arm is attached.

6. In a stalk gatherer for row crop harvesters:
   a primary gathering unit having a pair of horizontally spaced horns, presenting a forwardly opening, stalk receiving throat; and
   a secondary gathering unit having a forwardly opening, stalk engaging yoke within said throat;
   said secondary unit being provided with a support for the yoke including:
   a pair of arms within a common vertical plane, attached to the yoke and extending rearwardly therefrom, and
   structure at the rearmost ends of the arms connecting the same with said primary unit.

7. In a stalk gatherer as claimed in claim 6 wherein said primary unit has a pair of generally U-shaped sections provided with rear, vertically spaced intermediate portions, said structure connecting each arm with a corresponding one of said portions.

8. In a stalk gatherer as claimed in claim 7 wherein said arms converge as the yoke is approached.

9. In a stalk gatherer as claimed in claim 8 wherein said structure pivotally connects the arms with said portions, wherein one of the arms is pivotally coupled with the yoke and wherein said arms are extensible for varying the height of the yoke.

10. In a stalk gatherer as claimed in claim 9 wherein said structure releasably connects the arms with said portions and wherein said secondary unit is invertible for further variance of the height of said yoke.

* * * * *